US009469280B2

(12) United States Patent
Baird

(10) Patent No.: US 9,469,280 B2
(45) Date of Patent: Oct. 18, 2016

(54) POWERED JACKING LEG

(71) Applicant: Razor International Pty Limited, Sunshine (AU)

(72) Inventor: Darryl Baird, Sunshine (AU)

(73) Assignee: Razor International Pty Limited, Sunshine Victoria (AU)

( * ) Notice: Subject to any disclaimer, the term of this patent is extended or adjusted under 35 U.S.C. 154(b) by 225 days.

(21) Appl. No.: 14/030,475

(22) Filed: Sep. 18, 2013

(65) Prior Publication Data
US 2014/0077140 A1 Mar. 20, 2014

(30) Foreign Application Priority Data

Sep. 18, 2012 (AU) ................................ 2012904072
Apr. 4, 2013 (AU) ................................ 2013202391

(51) Int. Cl.
*B60S 9/08* (2006.01)

(52) U.S. Cl.
CPC ............. *B60S 9/08* (2013.01); *Y10T 74/19279* (2015.01)

(58) Field of Classification Search
CPC ........................... B60S 9/08; Y10T 74/19279
See application file for complete search history.

(56) References Cited

U.S. PATENT DOCUMENTS

| 2,321,672 | A | * | 6/1943 | Hall ................... | F16H 61/0293 192/103 A |
| 3,222,948 | A | * | 12/1965 | Demart ................... | B60S 9/08 74/89.28 |
| 3,523,599 | A | * | 8/1970 | Denkowski ............... | B66F 3/18 192/150 |
| 4,400,986 | A | * | 8/1983 | Swanson ................... | B60S 9/08 280/766.1 |
| 4,402,526 | A | * | 9/1983 | Huetsch .................... | B60S 9/08 280/766.1 |
| 4,635,904 | A | * | 1/1987 | Whittingham ........... | B60S 9/08 192/56.62 |
| 5,542,647 | A | * | 8/1996 | Huetsch .................... | B60S 9/08 254/103 |
| 7,258,363 | B2 | * | 8/2007 | Baxter ...................... | B60S 9/08 280/6.153 |
| 2001/0054815 | A1 | * | 12/2001 | Baird ........................ | B60P 1/56 280/766.1 |
| 2003/0011182 | A1 | | 1/2003 | Schmidt et al. | |
| 2003/0168648 | A1 | | 9/2003 | Alguera Gallego et al. | |
| 2003/0209896 | A1 | * | 11/2003 | Daniel ...................... | B60S 9/08 280/766.1 |
| 2005/0073130 | A1 | * | 4/2005 | McGlothlin .............. | B60S 9/08 280/475 |
| 2005/0073141 | A1 | * | 4/2005 | Baird ........................ | B60P 1/56 280/766.1 |
| 2005/0202923 | A1 | * | 9/2005 | Drake, III ................ | B60S 9/08 475/269 |
| 2006/0192507 | A1 | * | 8/2006 | Gill .......................... | B60S 9/08 318/114 |
| 2010/0176359 | A1 | * | 7/2010 | Wisner ...................... | B60S 9/08 254/425 |

FOREIGN PATENT DOCUMENTS

WO        0051859 A1      9/2000

* cited by examiner

*Primary Examiner* — Joseph J Hail
*Assistant Examiner* — Marc Carlson
(74) *Attorney, Agent, or Firm* — The Webb Law Firm

(57) ABSTRACT

Disclosed is a gearbox for a powered leg assembly for trailers. The gearbox includes a plurality of gears mounted in a cage, the cage being displaceable from a first low speed position through a neutral position to a second high speed position, and a lever coupled to an eccentric whereby movement of the lever causes displacement of the cage causing the gears to mesh to assume a low speed, neutral and high speed configurations.

20 Claims, 11 Drawing Sheets

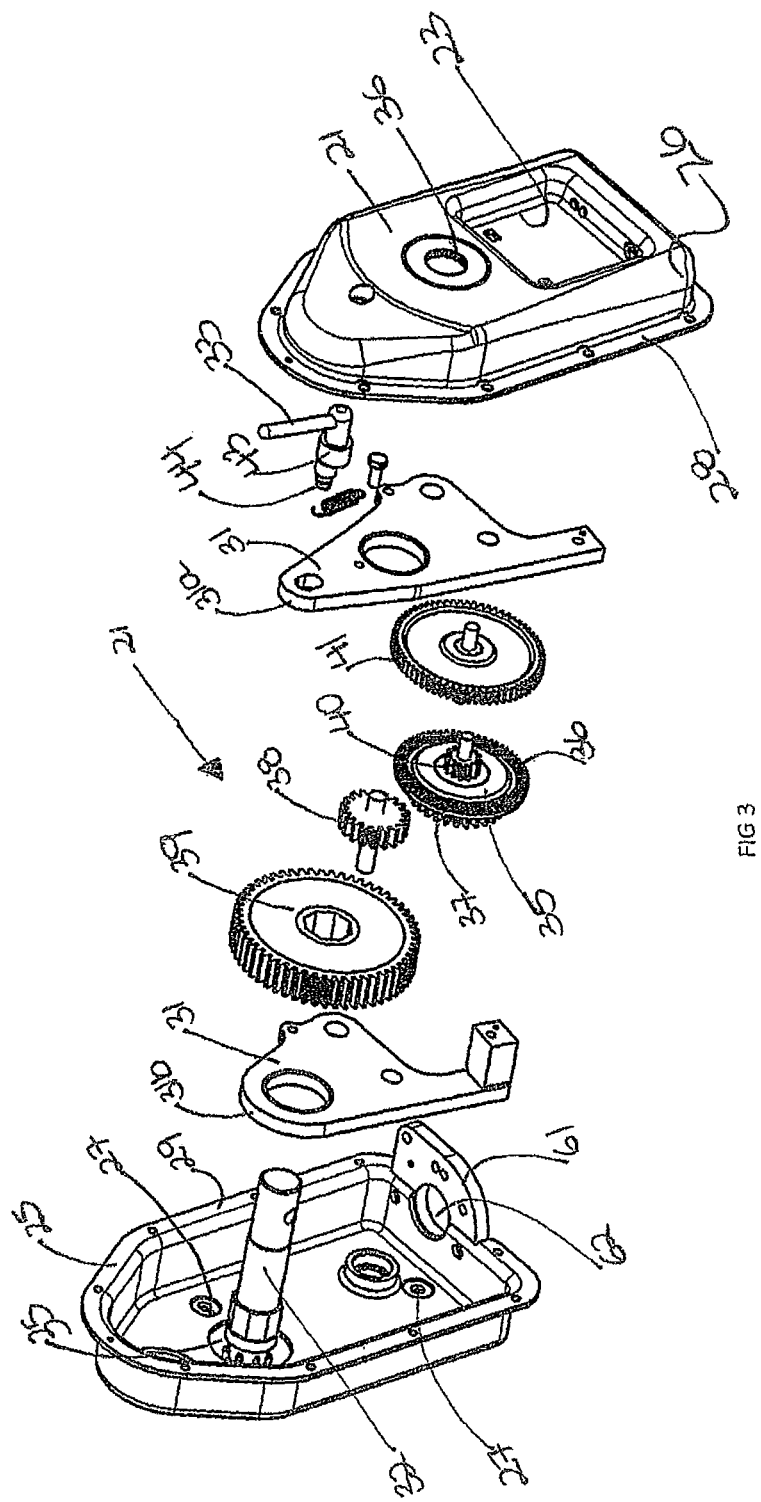

POWERED JACKING LEG

CROSS-REFERENCE TO RELATED APPLICATIONS

This application claims priority to Australian Patent Application Nos. 2012904072, filed Sep. 18, 2012 and 2013202391, filed Apr. 4, 2013, the disclosures of which are incorporated by reference in their entireties herein.

BACKGROUND OF THE INVENTION

1. Field of the Invention

This invention relates to a powered jacking leg that forms part of the landing gear for articulated trailers.

2. Description of Related Art

For many years articulated trailers have included manually operable jacking legs located at the forward end of the trailer. The manual raising or lowering of jacking legs is an onerous task requiring a significant degree of strength. Current laws relating to health and safety are raising serious questions about the potential hazards of manually operating the jacking legs of trailers.

There have been a number of proposals to automate the raising and lowering of the legs of trailers. One solution to this problem is suggested in our earlier patent application WO 00/51859. This application relates to a demountable system that could be attached to existing jacking leg structures to provide a powered drive through the use of an electric motor. Most jacking systems incorporate a gearbox that facilitates a speed change so that when the forces are low the leg can be moved at high speed but when a heavy load has to be lifted, the ratios can be substantially reduced to render the task easier.

A problem with the use of the existing speed change systems is that the speed change mechanism is cumbersome and at times difficult to operate. When the leg is under load it is very difficult to move the gear wheels from one position to another. Thus, the demountable powered systems tend to be bulky and at times difficult to operate.

It is these issues that have brought about the present invention.

SUMMARY OF THE INVENTION

In one aspect of the present invention there is provided a gearbox for a powered leg assembly for trailers, the gearbox comprising a plurality of gears mounted in a cage, the cage being displaceable from a first speed position through a neutral position to a second speed position, and a lever coupled to an eccentric whereby movement of the lever causes displacement of the cage.

Preferably there is provided a powered jacking system for use with articulated trailers, the system comprising a pair of opposed legs having feet that can be powered from a operational load supporting position to a retracted position, a screw drive in each leg operable to drive the feet, a transverse shaft connecting the screw drives and a gearbox of the kind described above secured to one leg to impart drive to each leg.

Preferably it is further provided with respect to the powered jacking system that each screw drive is positioned to be rotatable about a cage that moves up and down the screw drive to displace the foot, the cage abutting the end of the leg in the retracted position, damping means being positioned between the cage and the leg to reduce impact loads as the cage abuts the leg.

BRIEF DESCRIPTION OF THE DRAWINGS

An embodiment of the present invention will now be described by way of example only, with reference to the accompanying drawings in which:

FIG. 3 is an exploded perspective view of a gearbox of the drive means.

DESCRIPTION OF THE INVENTION

Figure 1:
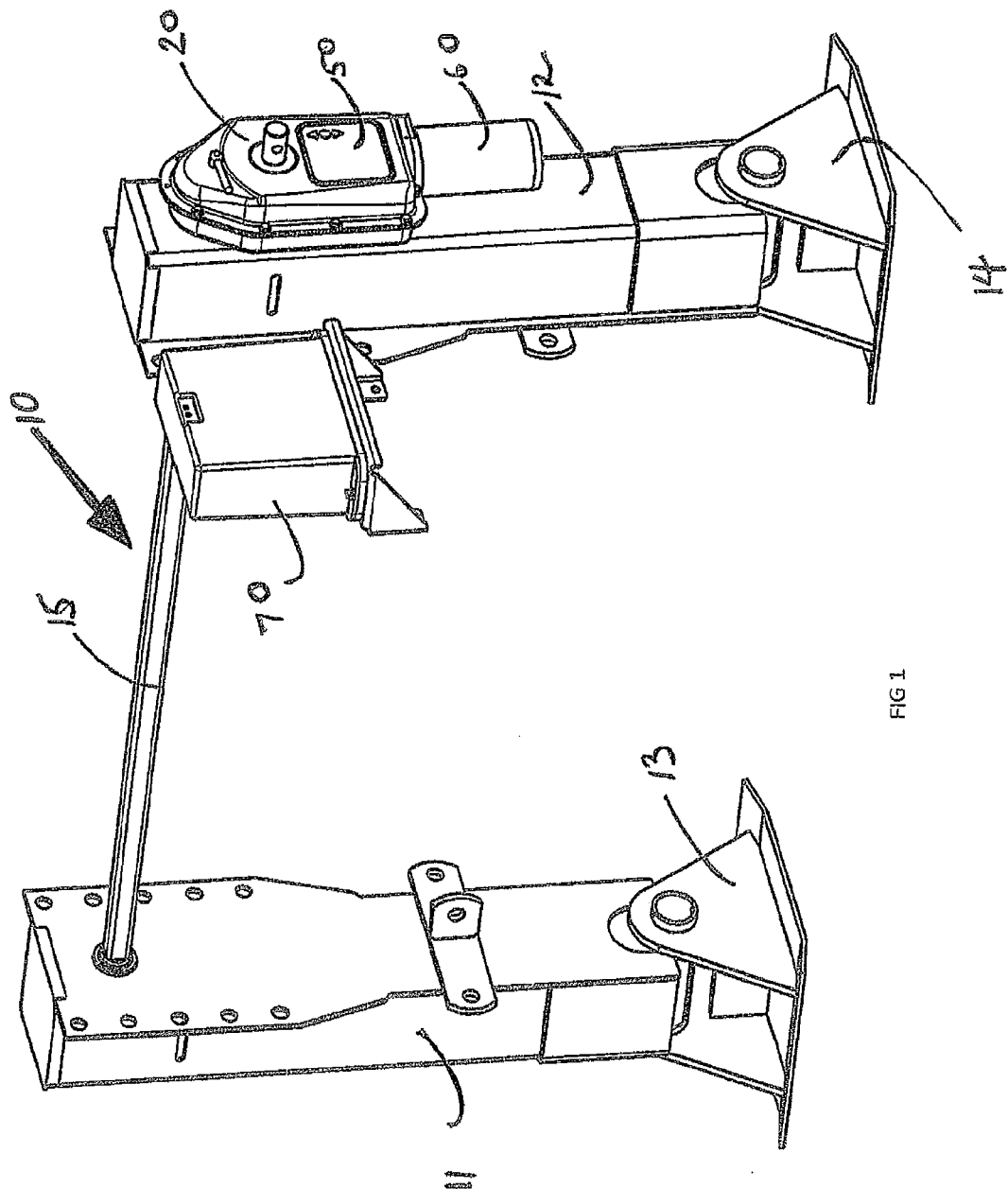
FIG. 1 is a perspective view of a jacking leg assembly of a trailer with a powered drive means attached to the leg.
Figure 2:
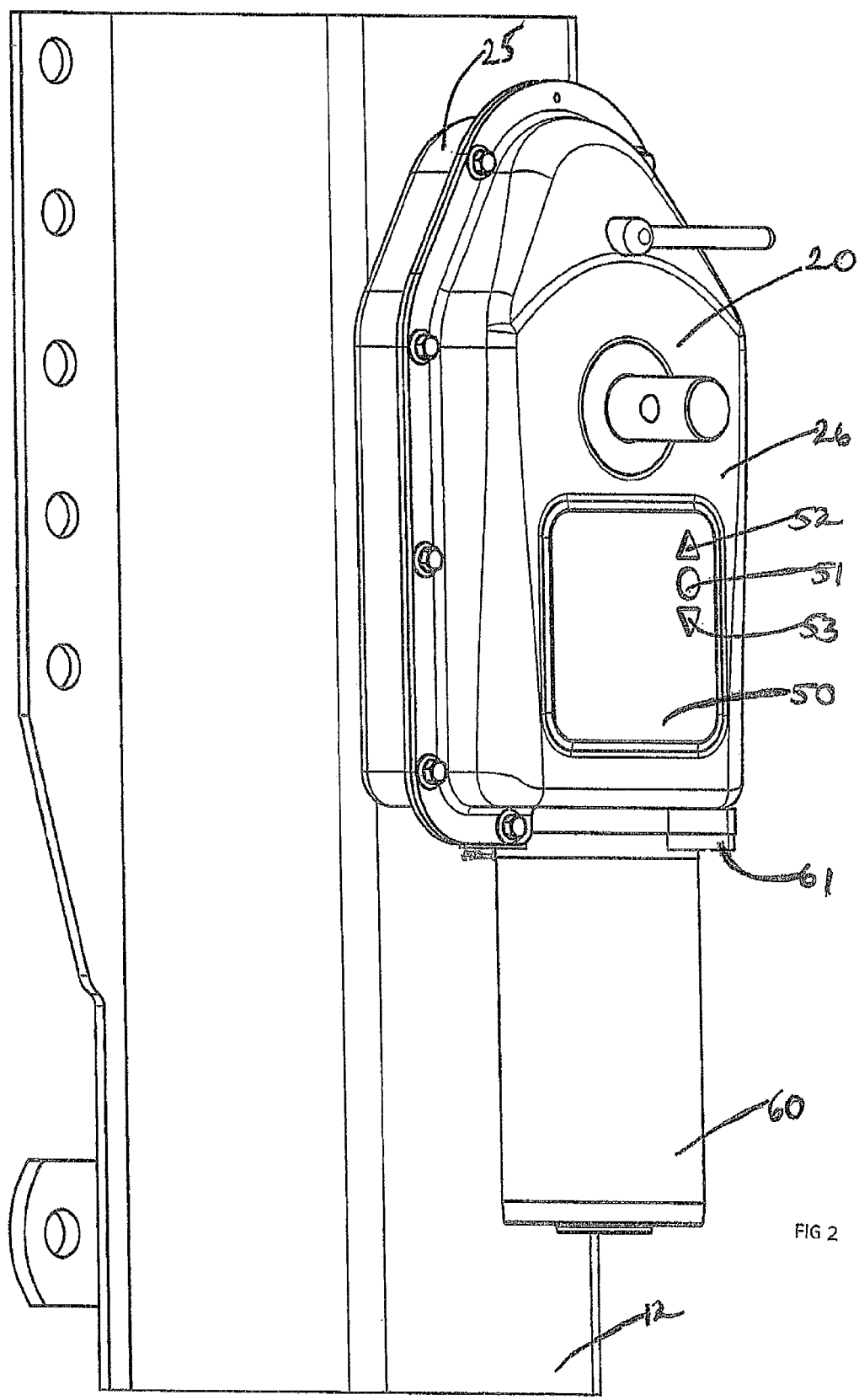
FIG. 2 is a perspective view on one leg of the assembly illustrating the drive means.

The trailer jacking leg assembly 10 illustrated in the accompanying drawings comprises two spaced leg structures 11 and 12 that are secured to the underside of the front of an articulated trailer (not shown). Each leg structure 11, 12 includes a foot 13, 14 that is displaceable vertically relative to the leg structure 11, 12. Each leg structure 11, 12 also includes a drive mechanism that is interconnected by a drive shaft 15 that extends across the leg structures so that rotation of the drive shaft 15 causes the feet 13, 14 to be raised or lowered as required.

As shown in FIG. 1 a powered drive mechanism 20 is secured to the front of one leg structure 12 to be coupled to the drive shaft 15 to provide a powered drive to raise or lower the feet 13, 14 of both leg structures 11, 12.

The powered drive means 20 essentially comprises a housing 21 that is adapted to be bolted to the forward face of the leg 12. The housing contains a gearbox that imparts drive to the forward projection of a stub axle that projects through the housing to locate in a socket on the front face of the leg. Although not shown the socket is geared to the drive shaft 15. The housing 21 also incorporates a control panel 50 that is located in a recess 23 in the front of the housing 21. An electric motor 60 is secured to the underside of the housing 21 to impart drive to the gearbox. Where necessary, a separate power pack 70 is mounted on the other side of the leg 12 to provide power to the motor 60. It is however understood that power could be driven by the prime mover or another source of power, namely the batteries located elsewhere on the trailer.

As shown in the exploded view of FIG. 3 the housing 21 encloses the gearbox 30 that includes a series of gear wheels mounted on a carriage 31 about a main shaft 32. The carriage 31 is mounted to a lever 33 that in operation causes the carriage 31 to move from three different orientations within the housing 21 to reflect connection of different gears to impart a speed change and a position of neutrality where the main shaft 32 can be manually turned to raise or lower the feet 13, 14.

The housing 21 is in two halves 25, 26 that are bolted together. The rear half 25 is firmly secured to the front face of the leg 12 via screws 27. This firm location has been designed to absorb the torque from the electric motor 60 through the gearbox 30. The front half 26 of the casing has a peripheral skirt 28 that is bolted to a similarly shaped skirt 29 on the lower half 25. The main shaft 32 extends through apertures 35, 36 in the housing halves 25, 26 to project forwardly from the front of the housing 21 to be connectable to a manual crank when necessary. The rearward extension of the main shaft 32 is the sub axle.

The front half 26 of the housing has a rectangular recess 23 into which is located the control panel 50. When the housing halves 25, 26 are assembled the underside of the housing defines a plate 61 with a central aperture 62. The electric motor 60 is bolted to the plate 61 so that a bevel gear (not shown) mounted on the output shaft of the electric motor 60 extends though the aperture 62 into the housing 21 to engage the gear assembly.

The gearbox has a primary gear 35 having a bevelled front face 36 to be driven by the bevel gear (not shown) mounted on the output shaft of the electric motor 60. The rear side of the primary gear 35 has a gear 37 that in turn meshes with a high speed lay gear 38 to drive a tertiary gear 39 that is mounted on the main shaft 32. The front of the primary gear has a smaller gear 40. A low speed drive is effected through the meshing of the smaller gear 40 with a secondary gear 41. Secondary gear 41 has a solidly coupled pinion gear 42 on its rear side which in turn meshes and imparts a drive to the tertiary gear 39 that is mounted on the main shaft 32.

Figure 4B:
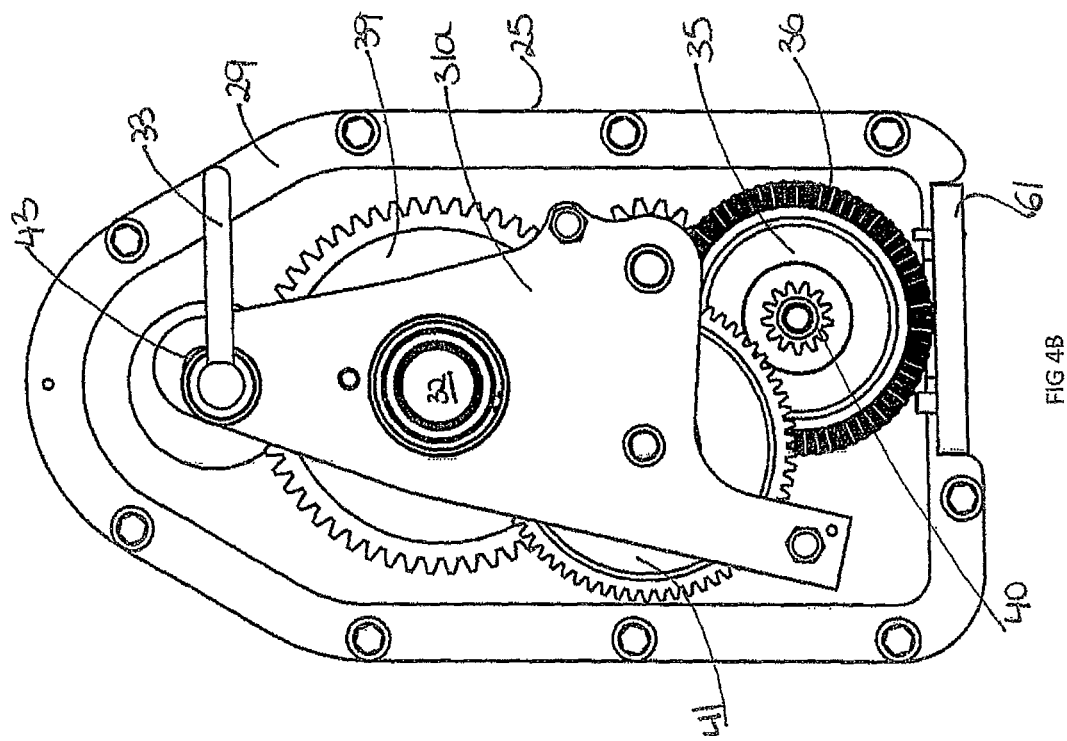
FIG. 4b is a front elevational view of the gearbox in a high speed mode.
Figure 4A:
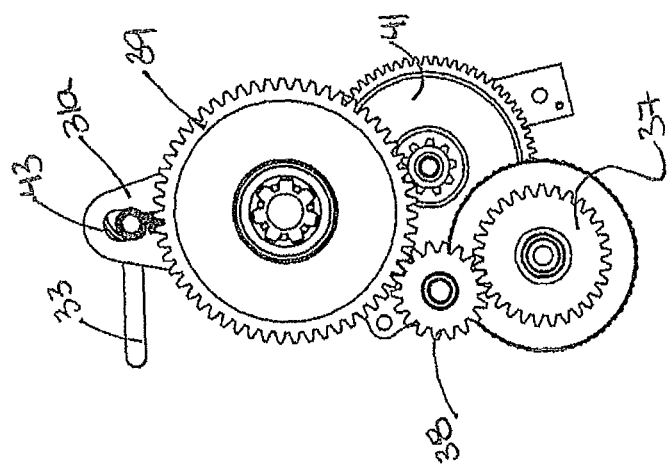
FIG. 4a is a rear elevational view of the gearbox with parts removed showing the box in a high speed mode.
Figure 6:
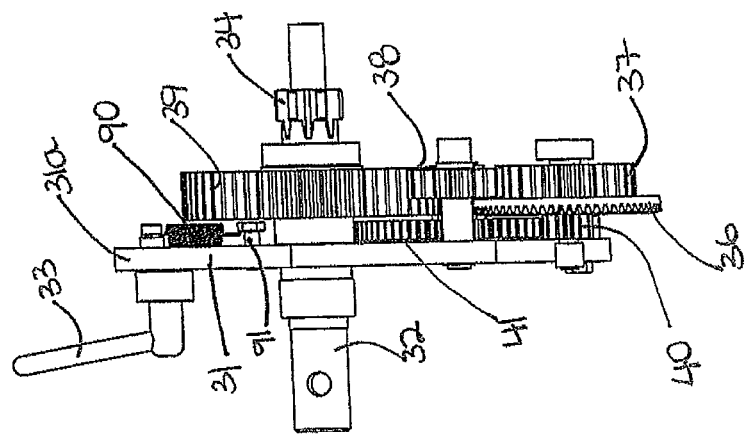
FIG. 6 is a side elevational view of the gearbox in the neutral mode.
Figure 7B:
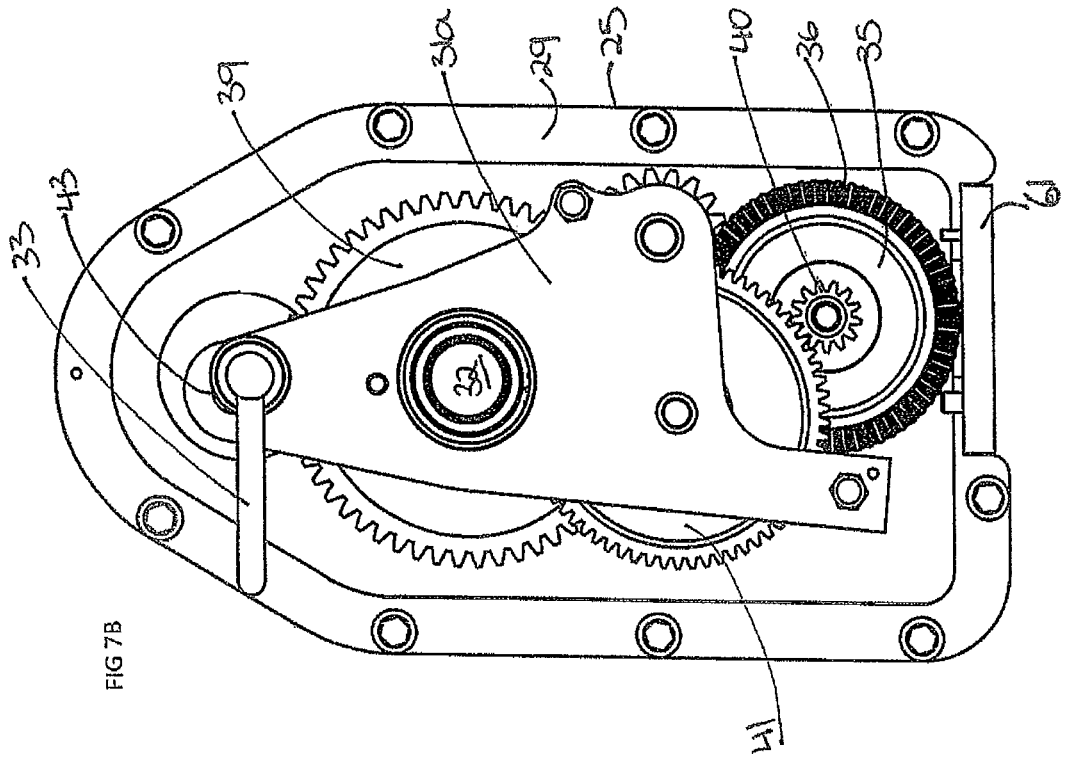
FIG. 7b is a front elevational view of the gearbox in a low speed mode.
Figure 7A:
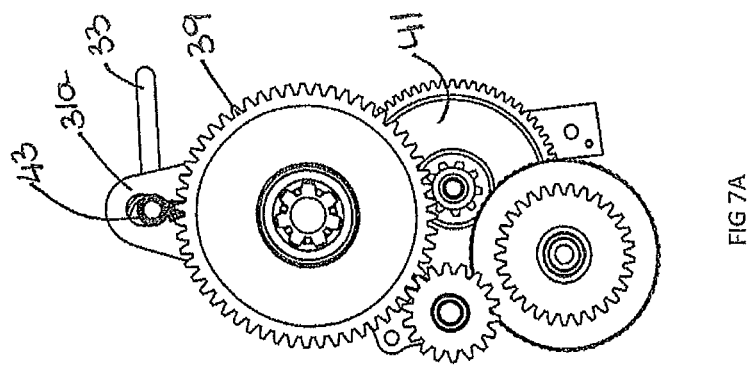
FIG. 7a is a rear elevational view of the gearbox in a low speed mode.

The change between low speed to high speed is effected by pivotal movement of the carriage 31 and in the low speed mode the carriage assumes the position shown in FIGS. 7a and 7b where the secondary gear 41 is meshing with the smaller gear 40 on the primary gear 35. In the high speed mode the carriage 31 is moved to the position shown in FIGS. 4a and 4b in which the secondary gear 41 is now moved away from the smaller gear 40 on the primary gear 35 and the drive is imparted through the larger gear 37 on the rear of the primary gear 35 which drives the high speed lay gear 38 which in turn meshes with the tertiary gear 39 on the main shaft 32. The low speed gear operates at a speed of about 6% of the speed of the high speed gear.

Figure 5:
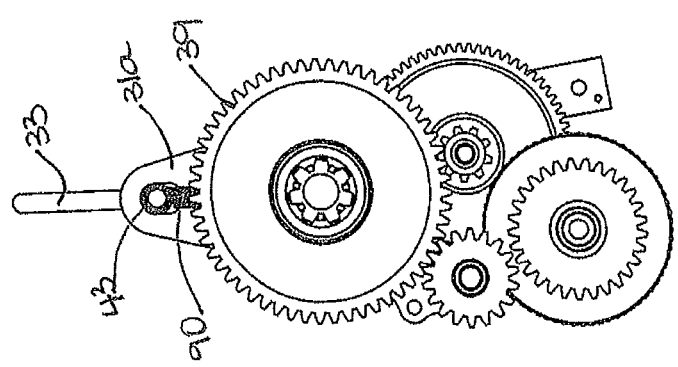
FIG. 5 is a rear elevational view of the gearbox with parts removed in a neutral mode.

The carriage 31 is in the form of two plates 31a, 31b spaced in a parallel array with appropriately positioned apertures with bearings to support the main shaft 32, and the shafts supporting the secondary gear 41 and high speed lay gear 38. The primary gear 35 is supported by the housing halves and the tertiary gear 39 is on the main shaft 32. The movement of the front face 31a of the carriage to effect gear changes is by an eccentric 43 driven by a shaft 44 that extends through the front of the housing 21 to be attached to a small lever 33 which, as can be seen from FIGS. 4, 5 and 7 can be moved from three positions namely, a position pointing to the left to determine a high speed mode and a position pointing to the right to determine a low speed mode. If the lever 33 is moved to the vertical configuration (FIG. 5), the drive from the electric motor is disengaged, which means that the main shaft 32 is free to rotate without causing rotation of the primary gear in the gearbox and subsequently the electric motor. This provides manual operation with minimum drag.

Figure 9:
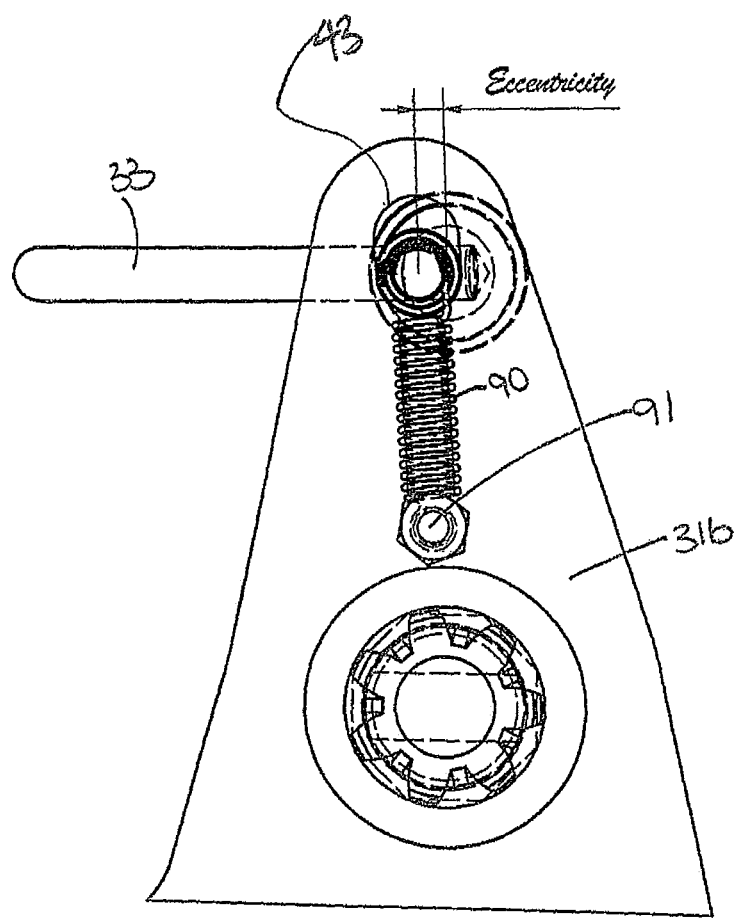
FIG. 9 is a rear view of a plate forming part of the gearbox in an engaged mode.
Figure 10:
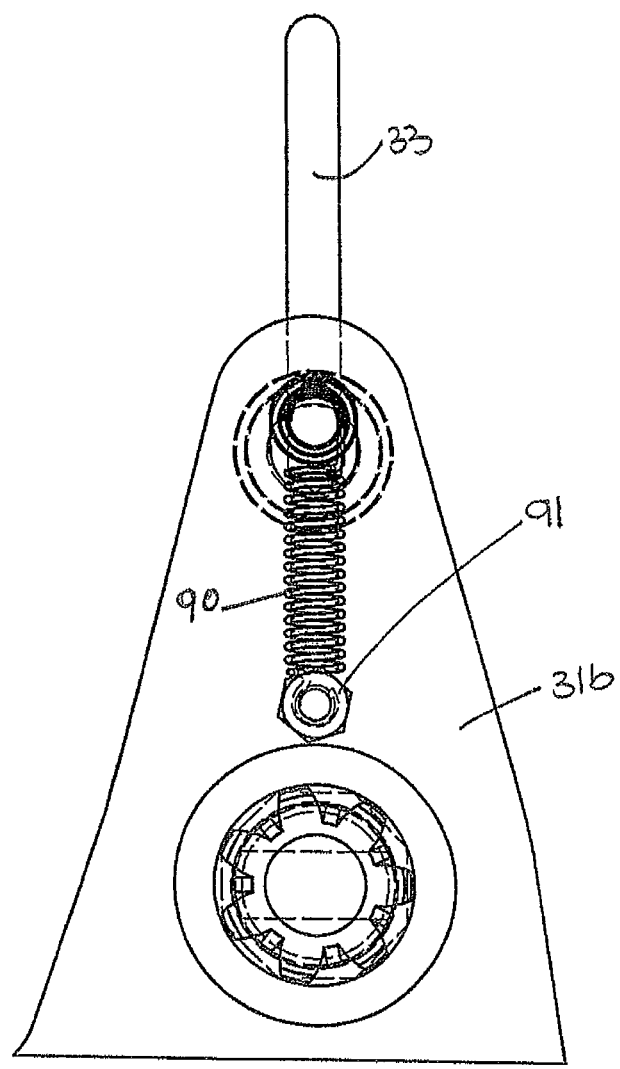
FIG. 10 is a rear view of the plate in a neutral mode.

As shown in FIGS. 9 and 10 a coil spring 90 extends between the eccentric 43 and a bolt 91 on the front plate 31a. When the lever 33 is in either of the engaged positions FIGS. 4a, 7a and 9, the spring 90 is compressed state of reduced tension. When the lever is in the neutral position FIGS. 5 and 10, the spring 90 is extended to a higher state of tension. A force is required to extend the spring 90 to move away from either engaged positions. Thereby ensuring the gears stay in the engaged state until the eccentric 43 is operated to change the gears state of engagement.

The electric motor is provided with a pair of pins that operate as the electrical terminals, these pins are arranged to extend through the housing and engage the underside of female recesses in the control panel. In this way, power from the control panel is fed directly to the electric motor. The power to the control panel comes from separate wiring from the power source (not shown). The control panel 50 includes an stop switch 51 and a raise and lower buttons 52, 53. The control panel is a modular unit that has tabs on the rear side (not shown) and is simply slotted into the recess 23 and held therein by the pins of the motor. The motor is secured to the casing by two bolts that extend into the mounting flange. The drive mechanism 20 is comparatively slim and thus causes minimum obstruction to the leg assembly.

Figure 8A:
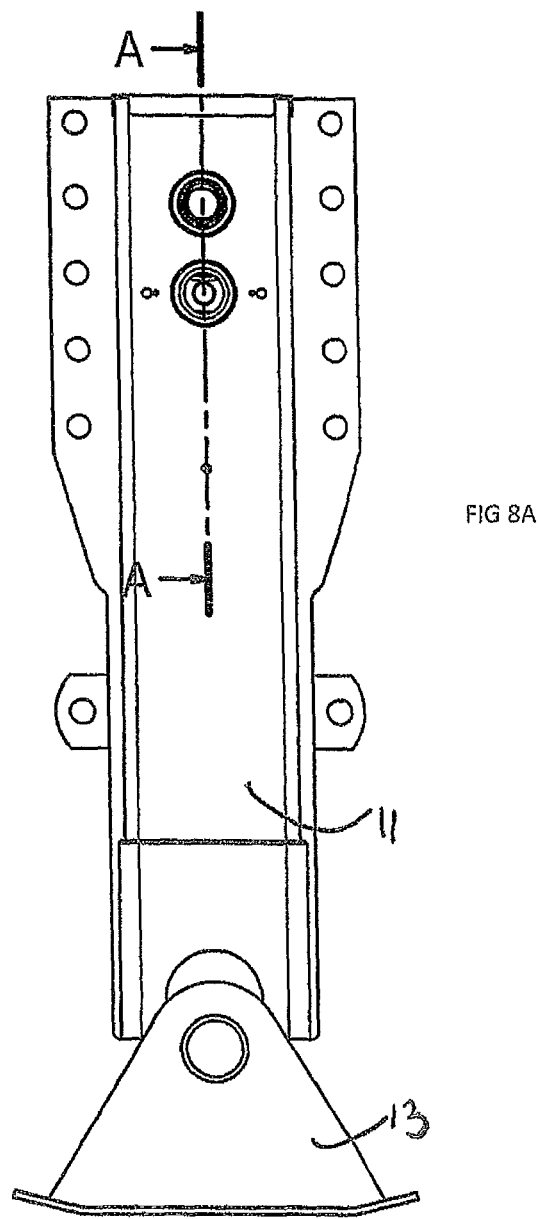
FIG. 8a is a front elevational view of one jacking leg.
Figure 8B:
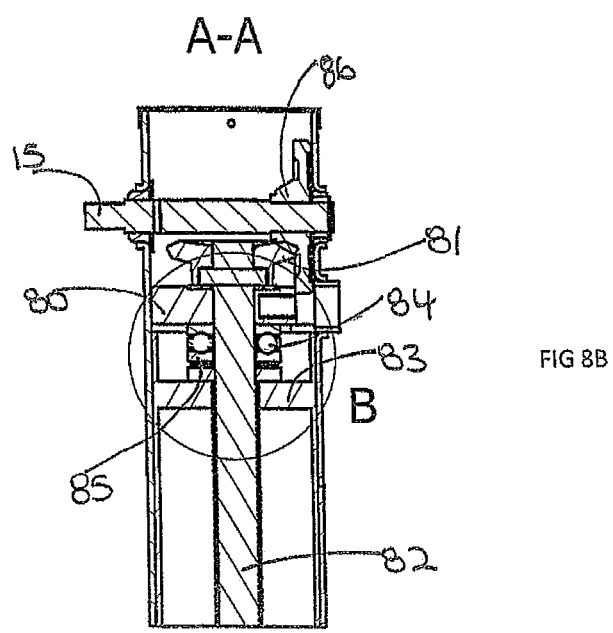
FIG. 8b is a cross sectional view taken along the lines A-A of FIG. 8A.
Figure 8C:
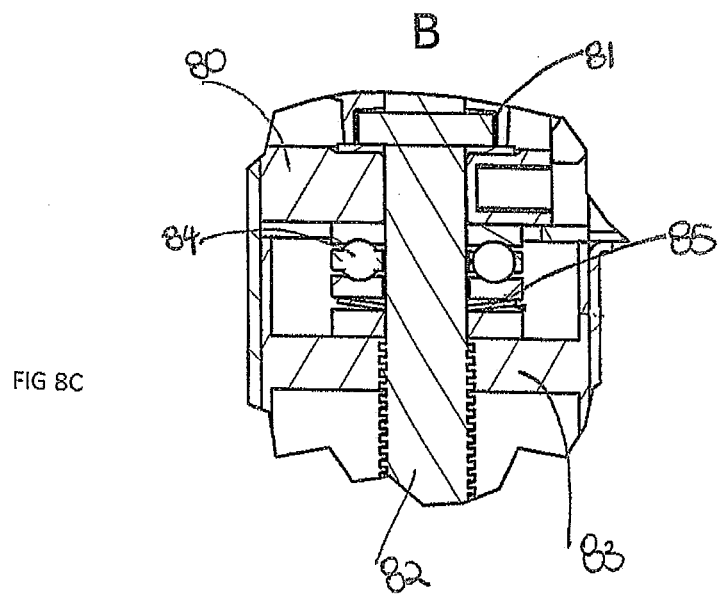
FIG. 8c is an enlarged view of the top of the leg shown in the circle B of FIG. 8b.

FIGS. 8a, 8b and 8c show one of the legs 11 supporting a foot 13. The stub axle 32 from the drive mechanism includes a gear 34 that imparts drive to the gear 80. Gear 80 includes a bevel gear 86 on its inboard face that inturn drives bevel gear 81. Bevel gear 81 is supported on the end of a rotating elongate screw 82 that is in turn threaded engagement with a cage 83. The screw is free for axial rotation about a bearing 84. The bevel 81 meshes with the shaft 80 and the main drive shaft 15 that extends between the legs 11, 12. In each leg 11, 12 a Belleville washer 85 is positioned between the bearing 84 and the cage 83. When the drive mechanism 20 drives the foot of the leg upwardly the cage 83 ultimately engages the end of the leg to stop the movement. The increase in current that takes place when the end of the cage 83 engages the leg causes the motor 60 to switch off. However, the high speed of the leg when it is lifting under no load has a tendency of causing severe shocks as the cage 83 hits the end of the leg. To reduce these shocks the Belleville washer 85 is positioned in between the bearing 84 and the cage 83. When the cage 83 first contacts the Belleville washer 85 the current increases causing the electric motor 60 to switch off and the flexing of the Belleville washer 85 absorbs the shock loads whilst the motor 60 is switching off and reduces the impact load that would otherwise be between the cage 83 and the top of the leg 11.

Figure 11:
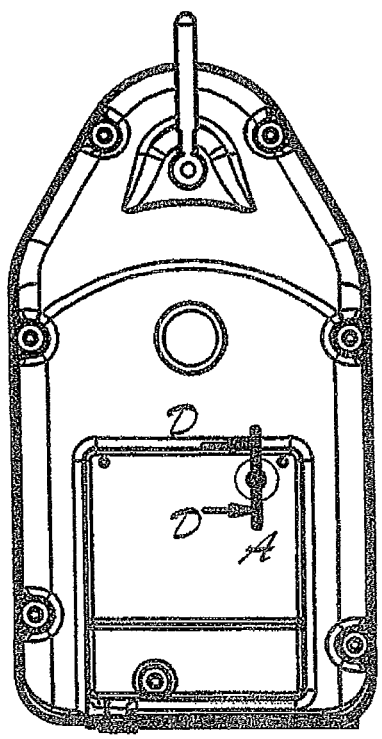
FIG. 11 is a front view of a housing of the drive means.
Figure 12:
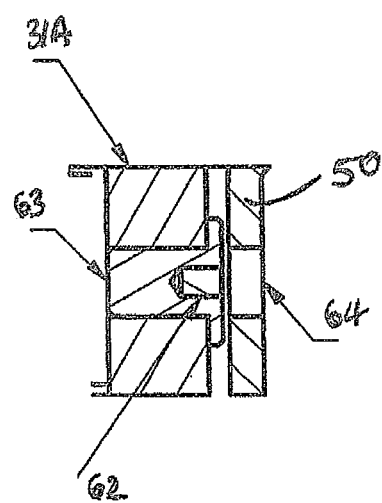
FIG. 12 is a cross sectional view taken along the lines D-D of FIG. 11.

FIGS. 11 and 12 illustrate a mechanism to reduce the likelihood of crashing or crunching of the gears during a speed change operation.

A rare earth magnet 62 is seated in a non magnetic plastics seat 63 within the front gear carriage plate 31a, when the gear carriage plate 31a is rotated by use of the gear change lever 33 the magnet 62 moves through an arc. This action sweeps the magnet past a magnetic switch (not shown) positioned within the control panel 50 and activates the switch when the plate and the gear lever is in the neutral gear position as shown in FIG. 11. The switch is located behind an aperture 64 in the housing recess 23 that supports the control panel 50. When the switch is activated the power to the motor is disabled thereby ensuring that the motor only operates whilst in gear. If the gear change lever 33 is activated whilst the motor is running power will be cut off to the motor before the gears have a chance to engage the non-spinning gear side. This reduces the damage to the gears and simplifies the gear changing operation.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A gearbox for a multi-speed powered leg assembly for trailers, the gearbox comprising:
   a mechanically driven primary gear arrangement having a plurality of gears;
   a drive gear coupled to a drive shaft configured to raise or lower at least one foot of the powered leg assembly,
   a carriage assembly with a secondary gear arrangement pivotably mounted about a centerline of the drive gear, the carriage assembly containing a plurality of secondary gears for selective meshing the primary gear arrangement with the drive gear,
   a switching lever eccentrically coupled to the carriage assembly for selection of a high speed position, a low speed position, or a neutral position,
   wherein the rotation of the switching lever to the low speed position pivotally displaces the carriage assembly to mesh at least one of the plurality of secondary gears with the primary gear arrangement and the drive gear,
   wherein the rotation of the switching lever to the high speed position pivotally displaces the carriage assembly to mesh at least another one of the plurality of secondary gears with the primary gear arrangement and the drive gear,
   wherein the rotation of the switching lever to the neutral position pivotally displaces the carriage assembly to disengage the plurality of secondary gears from providing a driven meshing engagement between the drive gear and primary gear arrangement.

2. The gearbox according to claim 1 wherein a first end of the drive shaft is adapted to be coupled to a gear drive of the powered leg assembly and a second end is adapted to be coupled to a crank to enable manual jacking of the leg in the neutral position.

3. The gearbox according to claim 2 wherein the primary gear arrangement, the secondary gear arrangement, the drive gear and the carriage are mounted in a two part housing that is bolted to the leg, the output shaft projecting forwardly and rearwardly of the housing.

4. The gearbox according to claim 3 wherein the front of the housing has a recess adapted to support a control panel including an on/off switch and a directional control.

5. The gearbox according to claim 1 wherein an electric motor with an output shaft supporting a bevel gear is bolted to the gearbox whereby the bevel gear imparts drive from the electric motor to the primary gear arrangement of the gearbox.

6. The gearbox according to claim 5 wherein the electric motor has pins that are adapted to engage sockets positioned in the control panel to transfer power from the electric motor to the control panel.

7. The gearbox according to claim 6 wherein a power pack is adapted to be screwed to the leg to provide power to the electric motor.

8. The gearbox according to claim 7 wherein the power pack, motor and control panel are modular interchangeable units.

9. The gearbox according to claim 1 wherein the switching lever is coupled to a spring that in use urges the gears into the low speed and high speed positions.

10. A powered jacking system for use with articulated trailers, the system comprising
    a pair of opposed legs having feet that can be powered from an operational load supporting position to a retracted position,
    a screw drive in each leg operable to drive the feet,
    a transverse shaft connecting the screw drives and a gearbox secured to one leg to impart drive to each leg, the gearbox comprising
       a mechanically driven primary gear arrangement having a plurality of gears;
       a drive gear coupled to the transverse shaft;
       a carriage assembly with a secondary gear arrangement pivotably mounted about a centerline of the drive gear, the carriage assembly containing a plurality of secondary gears for selective meshing the primary gear arrangement with the drive gear; and
       a switching lever eccentrically coupled to the carriage assembly wherein the rotation of the switching lever pivotally displaces the carriage assembly to change engagement of the secondary gear arrangement with the primary gear arrangement and the drive gear for selection of a high speed position, a low speed position, or a neutral position.

11. The powered jacking system according to claim 10 wherein the transverse shaft has a first end adapted to be coupled to a crank to enable manual jacking of the legs in the neutral position.

12. The powered jacking system according to claim 11 wherein the damping means is in the form of a Belleville washer positioned between the bearing cage and the end of the leg.

13. The powered jacking system according to claim 12 wherein the damping means is in the form of at least one disc spring washer positioned between the bearing cage and the end of the leg.

14. A gearbox for a powered leg assembly for trailers, the gearbox comprising a mechanically driven primary gear arrangement having a plurality of gears;
    a drive gear coupled to a drive shaft configured to raise or lower at least one foot of the powered leg assembly;
    a carriage assembly with a secondary gear arrangement, the carriage assembly containing a plurality of secondary gears for selective meshing the primary gear arrangement with the drive gear; and
    a switching lever coupled to the carriage assembly wherein the rotation of the switching lever pivotally displaces the carriage assembly to change engagement of the secondary gear arrangement with the primary gear arrangement and the drive gear for selection of a high speed position, a low speed position, or a neutral position, wherein the gearbox has an output shaft with a first end adapted to be coupled to the gear drive of a jackable leg and a second end adapted to be coupled to a crank to enable manual jacking of the leg.

15. The gearbox according to claim 14 wherein the primary gear arrangement, the secondary gear arrangement, the drive gear and the carriage are mounted in a two part housing that is bolted to the leg, the output shaft projecting forwardly and rearwardly of the housing.

16. The gearbox according to claim 15 wherein the front of the housing has a recess adapted to support a control panel including an on/off switch and a directional control.

17. The gearbox according to claim 15 wherein an electric motor with an output shaft supporting a bevel gear is bolted to the gearbox whereby the bevel gear imparts drive from the electric motor to the primary gear arrangement of the gearbox.

18. The gearbox according to claim 14 wherein the switching lever is coupled to a spring that in use urges the gears into the low speed and high speed positions.

19. The gearbox according to claim 14 wherein the switching lever is eccentrically coupled to the carriage assembly.

20. The gearbox according to claim 14 wherein the crank enables manual jacking of the leg in the neutral position.

\* \* \* \* \*